April 5, 1932.  O. E. ROSEN  1,852,335
HYDRAULIC TRANSMISSION
Filed Dec. 5, 1927  7 Sheets-Sheet 1

Fig.1

Inventor
Oscar E. Rosen
By Wilson & McCanna
Atty's

Fig. 2

April 5, 1932. O. E. ROSEN 1,852,335

HYDRAULIC TRANSMISSION

Filed Dec. 5, 1927 7 Sheets-Sheet 3

Inventor
Oscar E. Rosen
By Wilson & McCanna
Atty's

April 5, 1932. O. E. ROSEN 1,852,335
HYDRAULIC TRANSMISSION
Filed Dec. 5, 1927 7 Sheets-Sheet 4

Inventor
Oscar E. Rosen
By Wilson & McCanna
Atty's

April 5, 1932.  O. E. ROSEN  1,852,335
HYDRAULIC TRANSMISSION
Filed Dec. 5, 1927  7 Sheets-Sheet 5

Inventor
Oscar E. Rosen
By
Wilson & McCanna
Atty's

April 5, 1932.                O. E. ROSEN                1,852,335
                         HYDRAULIC TRANSMISSION
                    Filed Dec. 5, 1927        7 Sheets-Sheet 6

Inventor
Oscar E. Rosen
By Wilson & McCanna
Atty's

Fig.12 — High Speed Forward

Fig.13 — Direct Drive

Fig.14 — Neutral

Fig.15 — Reverse

Inventor
Oscar E. Rosen
By Wilson + McCanna
Atty's

Patented Apr. 5, 1932

1,852,335

UNITED STATES PATENT OFFICE

OSCAR E. ROSEN, OF DETROIT, MICHIGAN, ASSIGNOR OF ONE-THIRD TO ANDREW S. JOHNSON AND ONE-THIRD TO CARL A. JOHNSON, OF DETROIT, MICHIGAN

HYDRAULIC TRANSMISSION

Application filed December 5, 1927. Serial No. 237,607.

This invention relates to hydraulic or fluid transmissions adapted for general application wherever the characteristics peculiar to this type of power transmission may be desired. For example, the present transmission, by reason of the fact that it affords infinitely variable speeds forward anywhere from neutral up to direct drive and beyond to over-drives, and also affords a reverse drive, may be employed on motor cars and trucks or tractors, although, of course, many other uses therefor might be enumerated.

The principal object is to provide a hydraulic transmission operating on a differential principle by employing a hydraulic motor, and a pump for varying the speed or reversing the direction of drive of the driven element thereof in a novel manner as hereinafter described, the motor having a fixed displacement and the pump having a variable displacement and at an extreme setting having a greater displacement than the motor, and the pump being, furthermore, reversible in flow so as to operate with or in opposition to the motor. Thus, when the pump boosts the motor by delivering its output with the output of the latter any speed above direct drive is secured up to a maximum where the speed is more than twice the speed of the engine or other power source. Then, when the output of the pump is cut down to nothing direct drive is secured by reason of the motor alone. On the other hand, when the pump is made to buck the operation of the motor the speed is cut down anywhere from direct drive to neutral and beyond neutral to a reverse drive, the neutral point being that at which the output of the pump is equal, but opposite in direction, to the output of the motor, and the reverse drive being secured when the maximum output of the pump is opposite in direction to and overbalances that of the motor.

Other objects of the invention having reference to details of construction, arrangements, and combinations will appear in the course of the following description in which reference is made to the accompanying drawings, wherein—

The same reference numerals are applied to corresponding parts throughout the views.

Figure 11:
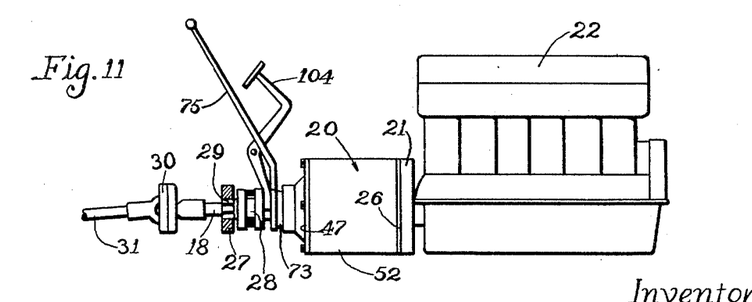
Fig. 11 is a view showing more or less diagrammatically the application of the transmission of Fig. 1 to an engine for an automobile, truck, or tractor.
Figure 12:
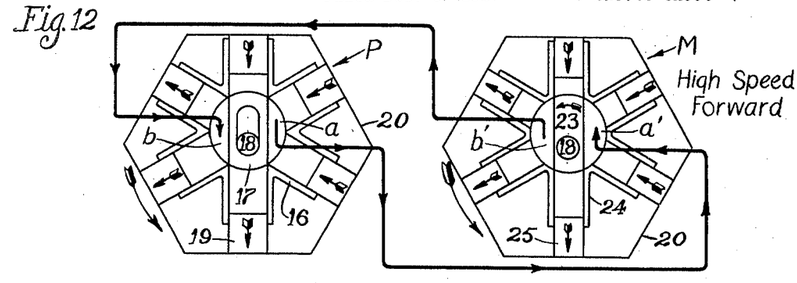
Figs. 12–15 are hydraulic circuit diagrams illustrating the cooperation of the pump and the motor of the transmission for the various drives forward and reverse as well as for neutral, as per the labeling thereof.
Figure 13:
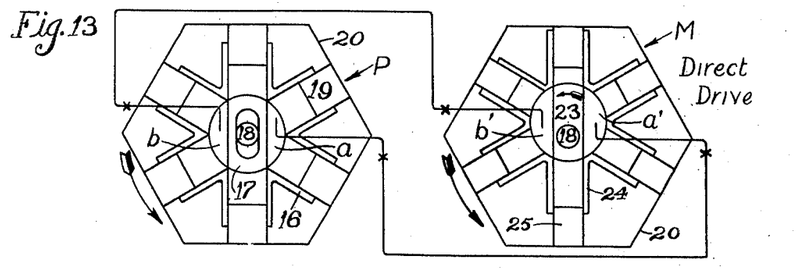
Figure 14:
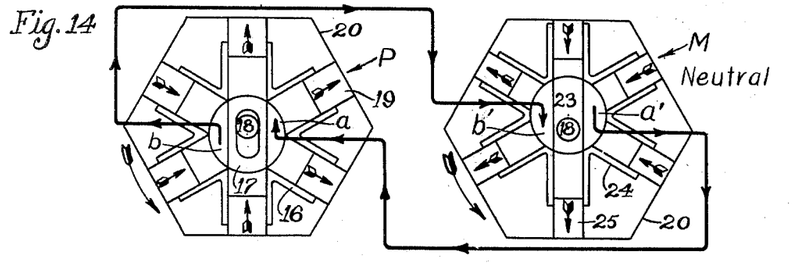
Figure 15:
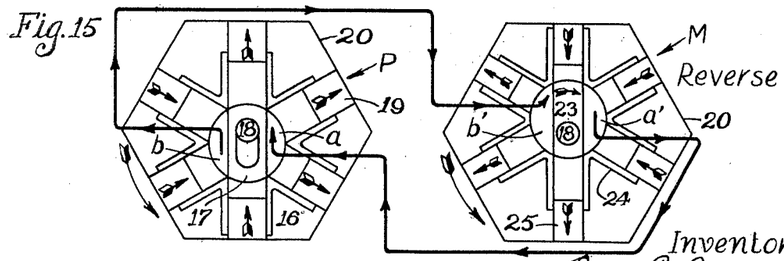

Reference will be made first to Figs. 12–15 to convey an understanding of the principle of operation of the transmission of my invention. The pump and motor above referred to are designated P and M, respectively. The pump P has the cylinder block 16 thereof rotatable on a non-rotatable pintle 17 arranged to be adjusted to various positions with respect to the central shaft 18 so as to bring the cylinder block 16 into concentric relation with said shaft, as shown in Fig. 13, or into eccentricity with respect thereto in one direction, as shown in Fig. 12, or into eccentricity in the opposite direction, as shown in Figs. 14 and 15. The cylinder block 16, with its pistons 19, is arranged to turn in the direction indicated by the arrows in Figs. 12–15 with the casing 20, which is concentric with the shaft 18. The shaft 18, as will presently appear, is the driven shaft and the casing 20 may be regarded as the driver since it stands in that relation to the shaft 18, although, as a matter of fact, the same is driven through a connection with a fly wheel 21 or other convenient part of an engine 22, as represented in Fig. 11. Of course, any power source might be employed. It is believed to be clear from the foregoing description that the pump P has a variable displacement and the flow therefrom is reversible and depends on the position of its pintle 17. Thus, the ports *a* and *b* of said pump are the outlet and inlet, respectively, when the pintle 17 is positioned, as shown in Fig. 12, but are the inlet and outlet, respectively, when said pintle is disposed as shown in Figs. 14 and 15. The motor M, on the other hand, has a fixed displacement, that is, the rotary vane or eccentric 23 of said motor has a fixed radius of eccentricity with respect to the shaft 18, the same being fixed thereto and, as will presently appear, serving as the driven element arranged to transmit drive to the shaft in one direction, as shown in Figs. 12 and 13, or in the reverse direction as shown in Fig. 15. The cylinder block 24 of the motor M, with its pistons 25, is arranged to turn with the casing 20 and is, therefore, always turning at the same speed and in the same direction as the cylinder block 16 and pistons 19 of the pump P. The pistons 19 of the pump P are shown as being appreciably larger in diameter than the pistons 25 of the motor M so as to have proportionately greater displacement and hence afford a greater output from the pump P than from the motor M. The object in this difference in capacity between the pump and the motor will appear as the description progresses. It will be evident that the greater displacement of the pistons of the pump P might be secured by giving the same a longer stroke instead of providing the same of greater diameter and such a construction is regarded as the equivalent of the present one. So much for the general characteristics of the pump and motor. It will now be shown how the pump P boosts the motor M to give an over-drive of the shaft 18, and how the pump P bucks the motor M in cutting down the speed anywhere from direct drive to neutral and beyond neutral to reverse drive.

In describing the operation, direct drive and high speed forward will be considered together for convenience. In direct drive the pintle 17 of the pump P is disposed concentric with the shaft 18, as shown in Fig. 13, so that there is no output from said pump, whereas in highest speed forward said pintle is placed in a position of maximum eccentricity one way from the shaft 18 as shown in Fig. 12 for maximum output in the direction indicated by the arrows on the heavy lines extending to and from said pump. Direct drive will be considered first. It will be observed in Fig. 13 that inasmuch as there is no output from the pump P the ports *a'* and *b'* of the motor M are like closed chambers, that is, there can be no delivery from the port *a'* nor to the port *b'*. Consequently the vane or eccentric 23 is locked with the cylinder block 24 and pistons 25 and these parts all turn together counterclockwise as a unit, thus driving the shaft 18 by means of the vane or eccentric 23 at the same speed and in the same direction as the casing 20. Now, observing Fig. 12 for consideration of high speed forward, it will be seen that the output from the port *a* of the pump P is discharged into the port *a'* of the motor M and that the other ports *b* and *b'* are interconnected. As a result, the speed of rotation of the shaft 18 is stepped up proportionately to the boosting effect which the pump P exerts on the motor M. In other words, since direct drive was secured with no output from the pump P, an over-drive is secured when there is an output from said pump and, inasmuch as the pump P at the extreme setting has a greater output than the motor M, it will be evident that the speed of the shaft 18 is more than twice the speed of the casing 20 and hence of the engine driving the same. Of course, any intermediate drive between direct drive and high speed forward may be secured by varying the amount of eccentricity of the pintle 17. It will be evident that infinite variation in speed between certain definite limits is possible. Turning now to Figs. 14 and 15 for consideration of neutral and reverse, where the pump P bucks the motor M, it will be seen in Fig. 14 that when the pintle 17 is shifted to a position of a certain eccentricity opposite from that shown in Fig. 12 the character of the ports *a* and *b*, which served as outlet and inlet ports, respectively, in Fig. 12, is reversed and these ports become inlet and outlet ports respectively. The character of the ports *a'* and *b'* is likewise reversed, the ports *a'* and *b'* becoming outlet and inlet, respectively. The heavy lines with the arrows thereon show that the outlet port *b* of the pump P communicates with the inlet port *b'* of the motor M and that the inlet port *a* of the pump P communicates with the outfit port *a'* of the motor M. It will be evident that the bucking effect of the pump P on the motor M will cut down the speed of the shaft 18 according to the volume of the opposing output of the pump P. Thus, any drive intermediate direct drive and neutral can be secured by proper shifting of the pintle 17. At the particular point of eccentricity of the pintle 17 shown in Fig. 14, where the output of the pump P is exactly equal to that of the motor M, it will be manifest that, being opposite in direction, the output of the pump P will neutralize that of the motor M and the shaft 18 will be hydraulically fixed or braked. Hence, Fig. 14 is labeled "Neutral". Turning from it to Fig. 15, it will be seen that the further shifting of the pintle 17 to a position of maximum eccentricity opposed to that shown in Fig. 12 results in the output of the pump P overbalancing that of the motor M and, being opposite in direction, causes the vane or eccentric 23 and with it the shaft 18, to be turned in a clockwise direction, that is, opposite in direction to the turning of the casing 20. The speed which can be developed in the reverse direction obviously depends upon the output of the pump P being greater than that of the motor M. It may aptly be expressed in this way, "the difference makes the reverse". Here again it will be obvious that any speed intermediate neutral and highest speed reverse may be secured by shifting the pintle 17 to positions intermediate those shown in Figs. 14 and 15. Infinite variation in speed between certain definite limits in reverse is, therefore, obtainable in the same way as variation in speeds forward. The above is believed to convey a general understanding of the underlying principles of operation of this transmission. The construction of one practical embodiment of my invention will now be described.

Figure 1:
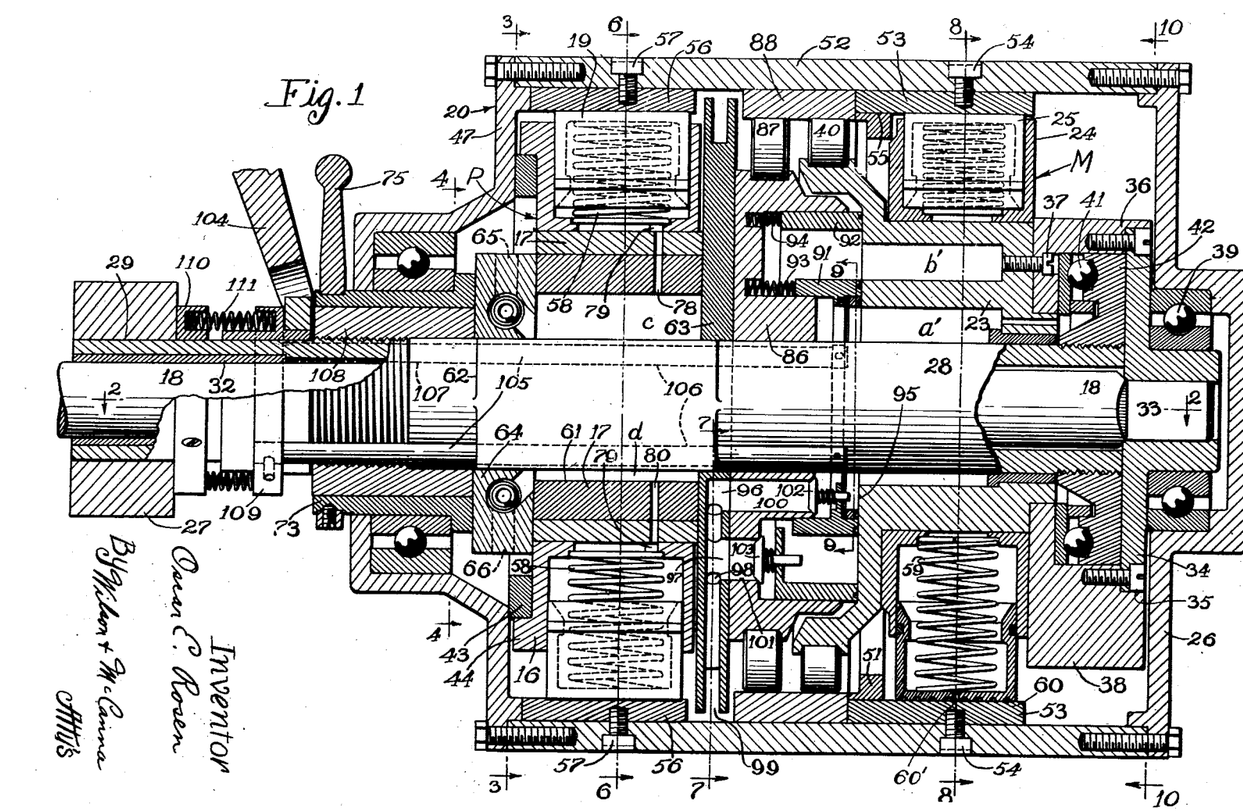
Figure 1 is a central vertical section through a transmission embodying my invention.
Figure 2:
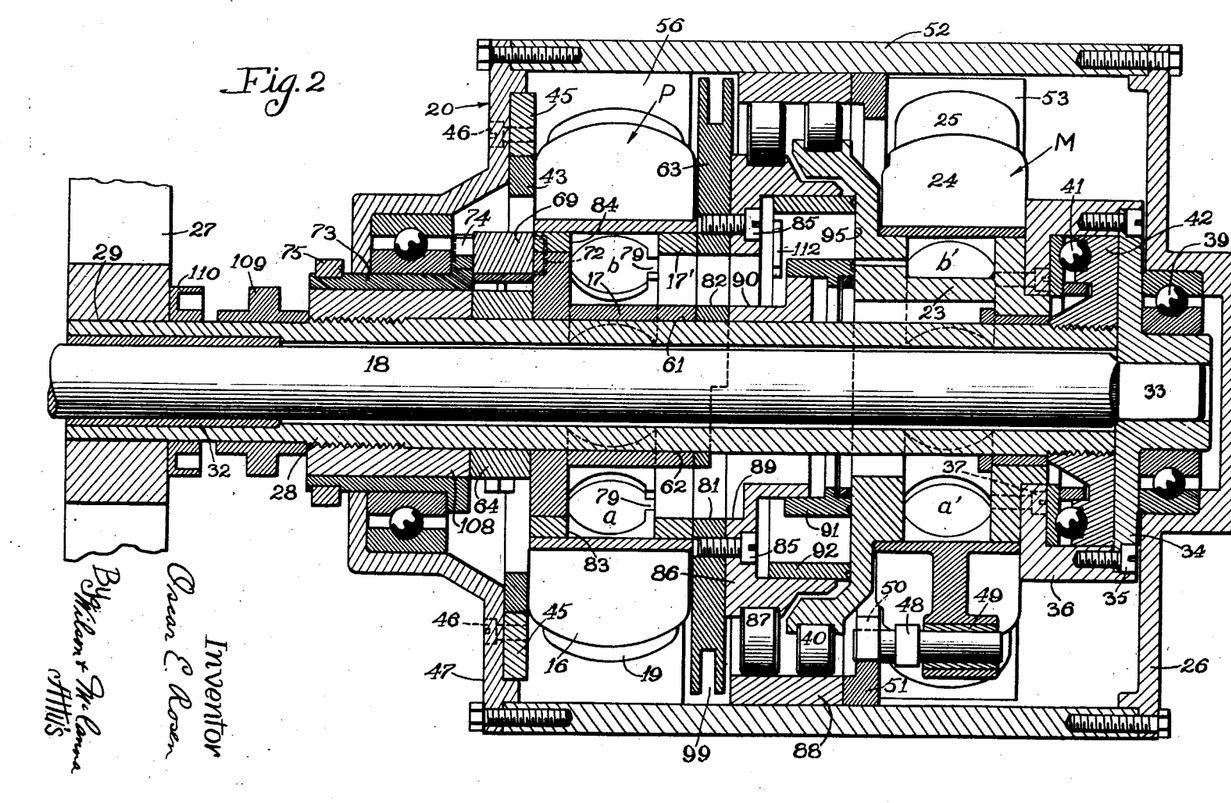
Fig. 2 is a horizontal section taken on the line 2—2 of Fig. 1.
Figure 3:
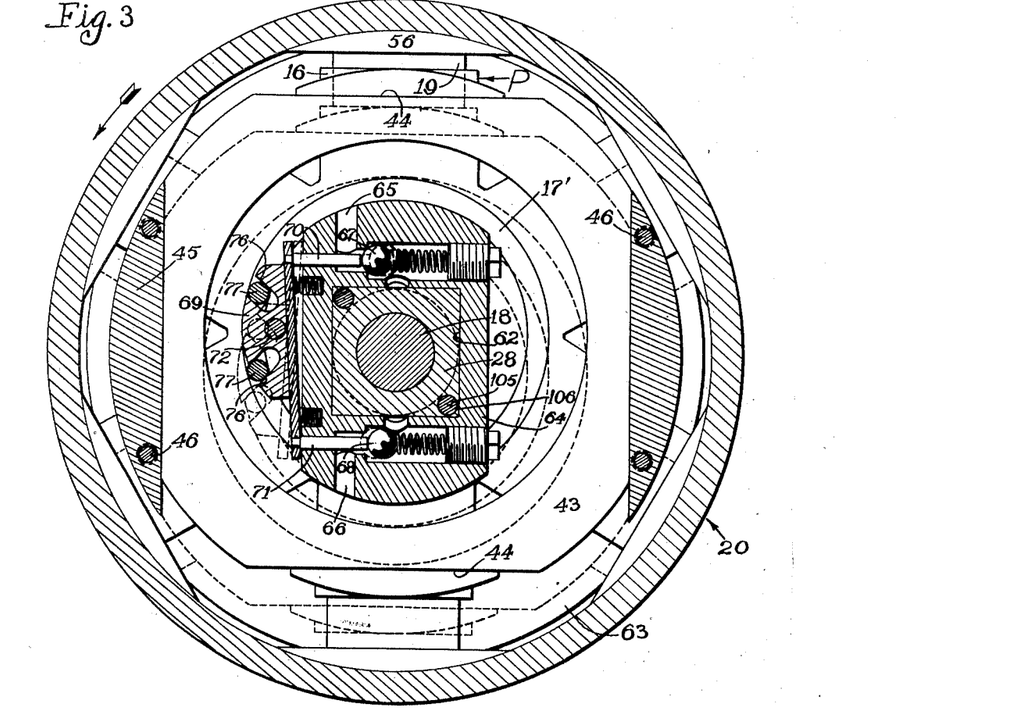
Figs. 3–10 are transverse sections taken on lines 3—3 to 10—10 of Fig. 1 looking in the direction indicated by the arrows, Fig. 5 being a section corresponding to Fig. 4 but showing the parts in a different position.
Figure 8:
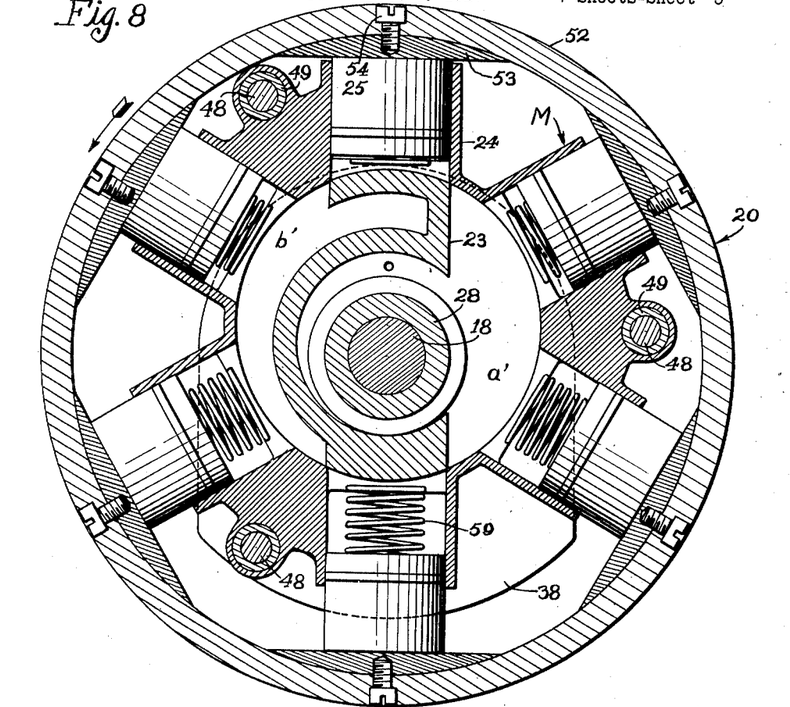
Figure 10:
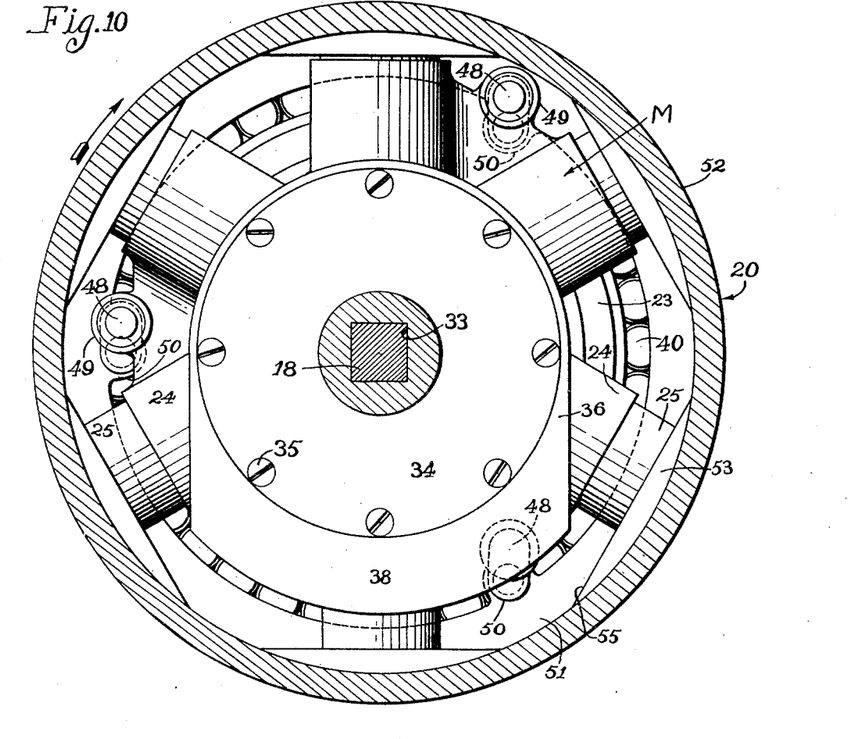

Referring for the present more particularly to Figs. 1 and 2, and to a certain extent also to Fig. 11, it will be seen that the casing 20 forms an oil-tight chamber for the pump P and motor M and for all the other operating parts of the transmission as well as the bearings therefor. It should be understood at the outset that this casing is full of oil or other fluid medium. The forward end plate 26 of said casing is arranged to be fixed to the fly wheel 21, as stated above, and thus supports one end of the casing. The other end of the casing is supported by a cross member 27 of the frame of the car, truck or tractor in which the transmission is installed, the support being through a fixed tubular shaft 28 splined or otherwise suitably secured at 29 to the cross member 27 so as to be held against turning. The driven shaft 18 extends through the tubular shaft 28 and rearwardly therefrom, as shown in Fig. 11, for connection through the usual universal joint 30 with the propeller shaft 31. A bushing 32 inside the shaft 28 provides a bearing for the shaft 18. The shaft 18 has a squared or faceted forward end 33 received in a hole of complementary form in a plate 34 fastened, as by means of screws 35, to a ring 36 which in turn is fastened by screws 37 to the vane or eccentric 23, previously referred to. Inasmuch as the vane or eccentric 23 is the driven element, as brought out in the course of the above description, it will be seen how power is transmitted through the ring 36 and plate 34 to drive the shaft 18. The form of the vane or eccentric 23 is somewhat evident in Figs. 1 and 2 but is shown to better advantage in Fig. 8. The ring 36 has a counterweight 38 thereon arranged to balance any otherwise unbalanced weight in the vane or eccentric 23, thereby making for smooth and easy running of the shaft 18. Now, considering the pump P and motor M, the operation of which determine the speed and direction of operation of the vane or eccentric 23 and hence of the shaft 18, it will be observed that the pintle 17, while adjustable from concentric relation with the shaft 18 to eccentricity in either direction with respect thereto is arranged, with the bushing 17' fixed thereon, to furnish a stationary, non-rotatable bearing in any position of its adjustment for the operation thereon of the cylinder block 16 of the pump P. The vane or eccentric 23 of the motor M on the other hand operates on a definite non-variable radius with respect to the shaft 18 and is arranged to serve as a rotary eccentric bearing for the cylinder block 24 of the motor M. The driving connections between the cylinder blocks and the casing 20 will now be described. The cylinder block 16 of the pump P has a slide 43, generally square or rectangular in form, as most clearly appears in Fig. 3, engaging lugs 44 at diametrically opposite ends thereof provided on the cylinder block, and reciprocable between two guides 45 fixed, as by means of screws 46, to the rear end plate 47 of the casing 20. Thus, regardless of the position of the pintle 17, the slide 43 provides a driving connection between the casing 20 and said cylinder block, the slide in the event of eccentricity of the pintle 17 in either direction with regard to the shaft 18 being caused to reciprocate between the guides 45 in the turning of the casing 20 in a manner believed to be evident. The cylinder block 24 of the motor M has a different type of operating connection with the casing 20 which is made necessary because of the turning of the vane or eccentric 23 not only relative to the casing but in either direction with respect thereto (see Figs. 1, 2, 8 and 10). A plurality of crank members 48 are interposed between crank pin bearings 49 provided on the cylinder block 24 and crank pin bearings 50 provided on a ring 51 fixed within the shell 52 of the casing 20 for rotation therewith. The driving connection between the ring 51 and the shell 52 is provided by plates 53, secured as by means of screw 54, inside the shell 52 and fitting in between the shell and flat cutaway portions 55 of the ring 51. The plates referred to act as bearings for the outer ends of the pistons 25 and in this respect are similar to plates 56 secured by screws 57 to the inside of the shell 52 and serving as bearings for the outer ends of the pistons 19 of the pump P. The cranks 48, it should be clear from the foregoing, provide a driving connection between the casing 20 and the cylinder block 24 while permitting of a certain amount of movement of the cylinder block relative to the casing required in operation. In each complete turn of the casing 20 and of the cylinder block 24 the cranks 48 each make a complete turn. This will be best understood by observation of Fig. 10 in which a comparison may be made of the positions occupied by the cranks 48 at different points in a complete turn. The pistons 19 of the pump P are urged outwardly toward engagement with the plates 56 by compression springs 58 and the pistons 25 of the motor M are urged outwardly toward engagement with the plates 53 by compression springs 59. The heads of the pistons are suitably grooved spirally, as indicated at 60 in Fig. 1, and are provided with openings 60′ through the heads thereof in order to insure the introduction of lubricant between the pistons and their plates, it being evident that the pistons will slide on the plates in the operation of the transmission. In this connection note Figs. 6 and 8, in which figures the fact that there is such movement is evident. The openings 60′ and grooves 60 cooperate in an obvious manner to prevent binding of the pistons on the plates and make for easy operation.

Figure 4:
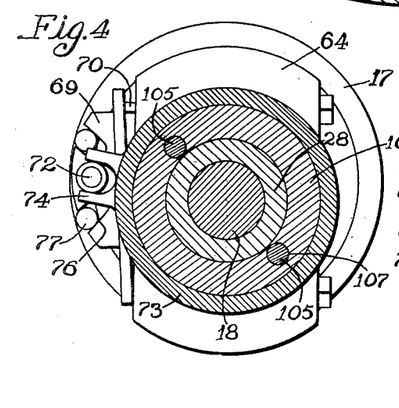
Figure 5:
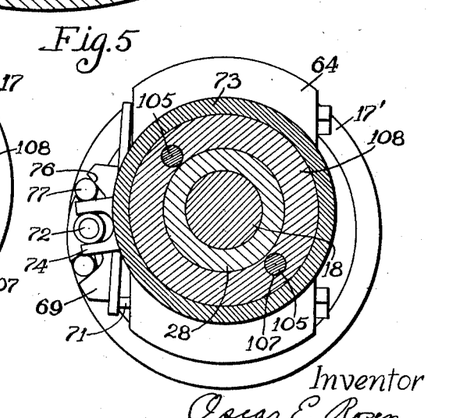
Figures 6, 7:
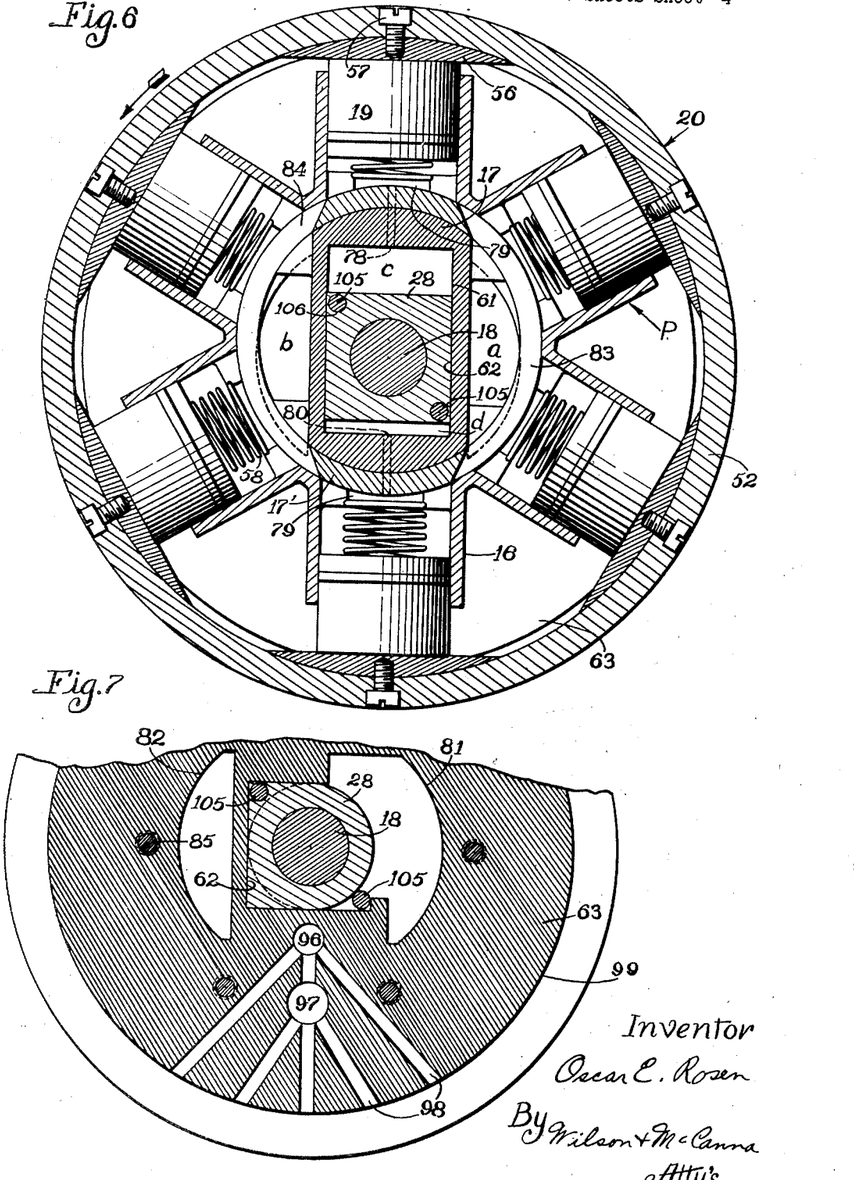

The means for and method of adjusting the pintle 17 of the pump P will now be described. The pintle 17 has a bore 61 of elongated rectangular form, as best appears in Fig. 6, in which the square portion 62 of the tubular shaft 28 is received. The pintle is thus held against turning but is arranged to be adjusted up and down with respect thereto from a position concentric with respect to the shaft 18 to positions of eccentricity one way or the other with respect to said shaft. Chambers $c$ and $d$ above and below the shaft as the parts appear in Figs. 1 and 6, are respectively enlarged and reduced in volume, or vice versa, in a manner presently to appear, depending in which direction the pintle is being adjusted. These chambers are closed at one end by a plate 63 fitting on the square portion 62 of the shaft 28 and at the other end by a plate 64 also fitting on the square portion 62 of the shaft 28. Ports 65 and 66 are provided in the plate 64 and are arranged to establish communication between the inside of the casing and the chambers $c$ and $d$ respectively. Ball check valves 67 and 68 are normally held seated under spring pressure to close said ports but are arranged to be opened selectively by rocking motion of a rocker 69. The latter has pins 70 and 71 at opposite ends thereof to engage and unseat the valves 67 and 68, respectively, and is pivoted intermediate its ends on a pin 72 which passes through the rocker 69 into a part of the pintle 17. The pin 72 provides a connection between the pintle 17 and a collar 73 through a fork 74 which is provided on the collar and has the pin 72 engaging therein, as shown in Figs. 4 and 5. The collar 73 is arranged to be turned slightly one way or the other by a lever 75 suitably fixed thereto outside the casing 20, as shown in Fig. 1 and as indicated in Fig. 11. The lever 75 corresponds to the gear shift lever of the ordinary transmission, as will presently appear, since, by the shifting thereof, the transmission affords different speeds forward and reverse. The lever 75 is arranged to be swung laterally relatively to the casing 20. This communicates movement to the collar 73 which in turn communicates movement up or down to the pintle 17. In the upward movement the valve 68 is unseated due to the rocking motion communicated to the rocker 69 by the engagement in diverging slots 76 of pin 77, provided on the bushing 17′ or on any other part fixed to or moving with the pintle 17. The opening of the valve 68 permits the discharge of oil from the chamber $d$ incident to the raising of the pintle. Of course, if the pintle were lowered the valve 68 would remain closed and the valve 67 would be opened to permit the discharge of oil from the chamber $c$. In the shifting of the pintle upwardly, as first described, oil is arranged to be delivered under pressure to the chamber $c$ so that the movement of the pintle is accomplished without any appreciable effort on the part of the operator in swinging the lever 75. Oil is likewise arranged to be delivered to chamber $d$ when the pintle is to be shifted downwardly, for a similar reason. The oil under pressure is delivered through a small hole 78 drilled through the pintle 17 and bushing 17′ for communication with the bores of the cylinder block 16 in their upper dead center position. The bores of the cylinders of the cylinder block 16 have openings 79 of a predetermined size, each of which comes into register with the hole 78 through approximately 30° of the travel of said cylinder block. Any void which might otherwise be created in the chamber $c$ in the raising of the pintle 17 is, therefore, made up by oil delivered through the hole 78. A hole 80 of similar character is provided for the chamber $d$ to supply oil thereto from the bores of the cylinder block in their lower dead center position in a similar manner when the pintle 17 is lowered. The arrangement by which the oil is supplied to whichever chamber is enlarged in the movement of the pintle also provides balanced pressure on the pintle offsetting any tendency for the pintle to be moved out of its adjusted position. Thus, taking for example the position in which the pintle 17 is shown, it will be evident that as each cylinder bore comes into register with the chamber $c$ through the hole 78 pressure is equalized between the chamber $c$ and the bore, thereby preventing movement of the pintle. The chamber $d$, during this time, remains open to the inside of the casing, namely, an area of substantially zero pressure so that there can be no disturbance of the pressure equalizing effect just referred to. A further fact to be taken into consideration as regards the fixedness of the pintle 17 in any position to which the same may be moved is that the pintle, being disposed between the plates 63 and 64, is held frictionally against movement by reason of the fact that the plate 63 is under pressure due to the fluid pressure which is active against the front face thereof in the operation of the transmission, as will presently appear.

The communication between the ports $a$ and $b$ of the pump P and $a'$ and $b'$ of the motor M will now be traced. The plate 63 has two openings therethrough, numbered 81 and 82, communicating directly with ports $a$ and $b$, respectively, of the pump P (see Fig. 2). The bushing 17' is cut away at 83, as shown in Fig. 6, to establish communication between the port $a$ and the bores of the cylinder block 16 during the turning of the latter. In the particular position in which the pintle 17 is shown, the port $a$ is serving as an outlet for the discharge of oil under pressure from the bores of the cylinder block as they come into register with the opening 83. In other words, this operation corresponds to that shown in Fig. 12, namely high speed forward, or at least some speed above direct drive. An opening 84, on the opposite side of the bushing 17', serves in a similar capacity to the opening 83 for the port $b$. The plate 63 is fixed, as by means of screws 85, to another plate 86 which serves as the inner race for the roller bearing 87, the outer race ring 88 of which is common to both the bearings 87 and 40. Openings 89 and 90 in the plate 86 register with the openings 81 and 82, respectively, of the plate 63. The opening 89 communicates with the interior of an inner oil sealing ring 91, whereas the opening 90 communicates with the interior of an outer oil sealing ring 92. The rings 91 and 92 are held by springs 93 and 94, respectively, toward sealing engagement with the flat face 95 provided on the side of the vane or eccentric 23. Now, inasmuch as the port $a'$ of the motor M communicates with the interior of the inside ring 91, as shown in Fig. 2, and inasmuch as the port $b'$ of said pump communicates with the interior of the outside ring 92, as clearly appears in Fig. 1, it will be evident how the ports $a$ and $a'$ of the pump P and motor M, respectively, are in communication with one another, and likewise the ports $b$ and $b'$.

The plate 63 has two openings 96 and 97 communicating with a plurality of ducts 98 which in turn communicate with an oil collecting annular groove 99 provided in the periphery of the plate 63. The openings 96 and 97 communicate with openings 100 and 101 provided in the plate 86, which openings are normally closed by valves 102 and 103, respectively, provided on the rings 91 and 92, as shown in Fig. 1. The valves 102 and 103 are in the nature of make-up valves or breathers arranged to be seated under light spring pressure, as indicated, and not only by such spring pressure but under any pressure of oil acting against the back thereof. Thus, for example, when the port $a$ is serving as an outlet, as in the present instance, the valve 102 is held seated not only under the action of its spring but also under hydraulic pressure.

The port $b$, however, under these circumstances is serving as an inlet and in the event of any leakage in either of the pumps creating a shortage of oil for the inlet port or ports (inasmuch as port $b'$ of the motor M is in communication with the port $b$ under the circumstances assumed), then the valve 103 is arranged to unseat to admit oil from within the casing to supply the shortage. On the other hand when the port $a$ is serving as an inlet the valve 102 is arranged to unseat to admit oil from within the casing in the event of any leakage in either of the ports causing a shortage of oil.

Figure 9:
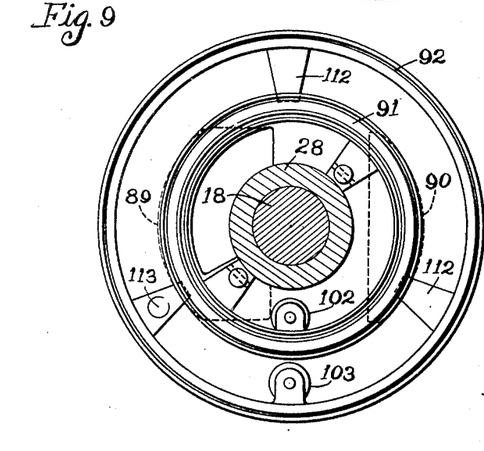

The oil sealing ring 91 is arranged to be unseated by the depression of a foot pedal 104 (see Fig. 11) to throw the ports $a$ and $b$ of the pump P as well as the ports $a'$ and $b'$ of the motor M into open communication with one another. This is equivalent to throwing out the clutch in the case of the ordinary transmission, inasmuch as the driven shaft 18 is thereby disconnected from driving relation with the motor. The means employed for operating the ring 91 by depression of the clutch pedal 104 will now be described. The ring 91 has connected therewith a pair of rods 105, slidably received in openings 106 provided in the square portion 62 of the tubular shaft 28 and in openings 107 provided in a bushing 108 and connected to a collar 109 slidably received on the shaft 28 between the bushing 108 and another collar 110 fixed on the shaft 28. Springs 111 acting between the two collars normally hold the collar 109 in the position shown in Fig. 1, in which position the sealing ring 91 connected to the rods 105 is in sealing engagement with the flat face 95 of the vane or eccentric 23. The clutch pedal 104 has a yoke portion engaging the collar 109 for shifting the same against the action of the spring 111 to unseat the ring 91. When filling the casing with oil it is necessary to unseat both the ring 91 and the ring 92 to permit the escape of the air. For this reason I provide for the unseating of the ring 92 only by extreme depression of the pedal, that is, beyond the usual operating range. The ring 92 has fingers 112 extending radially inwardly therefrom to a point behind the ring 91 (see Figs. 2 and 9), to be engaged by the ring 91 in an extreme retracted position thereof. At least one of the fingers 112 has an opening therein for the reception of a guide pin 113 provided therefor on the plate 86, as indicated in Fig. 9. It will be evident from the foregoing that the ordinary normal depression of the pedal 104 unseats the ring 91 to neutralize any difference in pressure between the ports $a$ and $b$ of the pump P and the ports $a'$ and $b'$ of the motor M and that it is possible also to unseat the ring 92 to allow the escape of air when the transmission is being filled with oil.

In concluding, the operation will be described without repetition of what has been said above regarding Figs. 12–15. It is believed evident from the foregoing description that when the pedal 104 is depressed the shaft 18 with the vane or eccentric 23 is disconnected from driving relation with the motor, the effect being the same as when the clutch in the ordinary change gear transmission is thrown out. Thus, the pedal 104 may be depressed in coasting or when the car is standing with the motor idling, although, of course, in the latter case the lever 75 may be shifted to neutral position for the same effect. Obviously, when the lever 75 is shifted more and more to the right of neutral the speed is increased anywhere from neutral to direct drive and beyond direct drive to over-drives up to highest speed forward which, as stated above, is a little more than twice the speed of the motor. On the other hand, when the lever 75 is shifted to the left of the neutral position reverse drives are secured. In the above description there occurs a complete explanation as to what determines the maximum speed in reverse so that there is no need of going into another discussion of this point except to state that the maximum speed in reverse can obviously never approach more than a fraction of the speed obtained in direct drive. The possibilities of utilizing the present transmission as a brake will be appreciated when it is considered that with the car traveling at a certain speed the mere shifting of the lever 75 to a position corresponding to a slower speed will result in the engine acting as a brake through the medium of the transmission, and if the lever is moved to neutral position the wheels are thereby locked, thus giving practically the effect of an emergency brake.

It is believed that the foregoing description conveys a clear understanding of my invention and of its various objects and advantages. While I have shown the invention as embodied in a transmission of a special construction it should be evident that changes both in construction and arrangement might be made without seriously departing from the spirit of the invention and for that reason the appended claims should be construed to cover all legitimate modifications, adaptations, and variations of the invention, such as will probably occur to those skilled in this art as a result of the present disclosure.

I claim:

1. In a fluid transmission, the combination of a casing arranged to be driven by a suitable power source, a fluid motor cylinder block within said casing, pistons operated from the casing through the open outer ends of the bores in said block, a vane within the block, a shaft extending from said vane for the transmission of power therefrom, said block having a crank connection with the casing to allow for the eccentric disposition of the block therein, a fluid pump cylinder block within said casing, pistons operated from the casing through the open outer ends of the bores in said block, a stationary pintle within the block adjustable to different positions of eccentricity relative to the casing, and means providing a universal sliding connection between said block and casing effective for all positions of the pintle, said pump having the inlet and outlet sides thereof communicating respectively with the outlet and inlet sides of the motor.

2. A fluid transmission as set forth in claim 1 wherein the pistons in the bores of said blocks project from the open outer ends of the bores for engagement with surfaces on the inside of the casing, the transmission including yielding means for urging said pistons outwardly toward engagement with said surfaces.

3. A fluid transmission as set forth in claim 1 wherein the vane of said motor separates the inlet side thereof from the outlet side, and wherein the pintle of said pump separates the inlet side thereof from the outlet side, the said inlets and outlets being in constant communication with one another.

4. A fluid transmission as set forth in claim 1 wherein the vane of said motor separates the inlet side thereof from the outlet side, and wherein the pintle of said pump separates the inlet side thereof from the outlet side, a pair of sealing rings substantially concentric with one another and with said casing within the latter and disposed between the pintle and vane elements of the pump and motor and detachably engaging a surface of one of said elements, the one ring establishing communication between the inlet side of the pump and the outlet side of the motor and the other ring establishing communication between the outlet side of the pump and the inlet side of the motor, the disengagement of the inner ring serving to throw the outlet and inlet of the pump as well as of the motor into open communication with one another for idle operation of the transmission.

5. A fluid transmission as set forth in claim 1 wherein the vane of said motor separates the inlet side thereof from the outlet side, and wherein the pintle of said pump separates the inlet side thereof from the outlet side, a sealing ring disposed substantially concentrically within said casing between the pintle and vane elements of the pump and motor and detachably engaging a surface of one of said elements, there being communication established on one side of said ring between the inlet the of the pump and the outlet of the motor and on the other side of the ring between the outlet of the pump and the inlet of the motor, the disengagement of said ring serving to throw the outlet and inlet of the pump as well as of the motor into open communication with one another for idle operation of the transmission.

6. A fluid transmission as set forth in claim 1 wherein the pistons project from the open outer ends of the bores in said blocks, the transmission including flat bearing surfaces provided on the inside of said casing for sliding engagement of the pistons therewith, and compression springs disposed in the bores of said blocks and acting between the inner ends of said bores and said pistons for urging the latter yieldingly toward engagement with said surfaces.

7. In a fluid power transmission, the combination of a fluid-tight casing arranged to be driven by a suitable power source, a stationary tubular shaft serving as a support whereon said casing is rotatable, a driven shaft received in bearings in said tubular shaft in concentric relation with said casing and arranged to turn relative to the casing or to remain stationary while the latter turns, a fluid motor cylinder block in said casing arranged to be supplied with fluid from within said casing, a vane for driving the driven shaft providing an eccentric mounting for the cylinder block, crank elements providing a predetermined off-center driving connection between the casing and said cylinder block, pistons operated from the casing through the open outer ends of the bores in said block, a fluid pump cylinder block in said casing arranged to be supplied with fluid from within said casing, the pump having its outlet communicating with the inlet of the motor and its inlet communicating with the outlet of the motor, means providing a universal driving connection between said casing and said pump cylinder block permitting the latter to be disposed concentric with the casing or eccentric with respect thereto, pistons operated from the casing through the open outer ends of the bores in said block, said tubular shaft having a squared portion, a pintle for the pump held against turning by the squared portion of said shaft and adjustable with relation to the latter from a concentric position to eccentricity with respect thereto, and means whereby the pintle is adjusted relative to the squared portion of the tubular shaft.

8. A structure as set forth in claim 7 including a sealing ring disposed substantially concentrically within the casing between the pintle and vane elements of the pump and motor and detachably engaging a surface of one of said elements, there being communication established on one side of said ring between the inlet of the pump and the outlet of the motor and on the other side of the ring between the outlet of the pump and the inlet of the motor, the disengagement of said ring serving to throw the outlet and inlet of the pump as well as of the motor into open communication with one another for idle operation of the transmission.

9. A structure as set forth in claim 7 including a sealing ring disposed substantially concentrically within the casing between the pintle and vane elements of the pump and motor and detachably engaging a surface of one of said elements, there being communication established on one side of said ring between the inlet of the pump and the outlet of the motor and on the other side of the ring between the outlet of the pump and the inlet of the motor, the disengagement of said ring serving to throw the outlet and inlet of the pump as well as of the motor into open communication with one another for idle operation of the transmission, and a make-up valve for at least one side of the ring controlling communication between the chamber on that side of the ring and the inside of the fluid-tight casing, said valve being normally disposed in closed position but arranged to open to relieve suction in said chamber.

10. In a structure as set forth in claim 7 wherein the pump pintle in its different positions of adjustment on the squared portion of the tubular shaft provides chambers therein between the pintle and the shaft, at least one of said chambers being normally closed whereby to prevent the movement of the pintle, valve means permitting the escape of fluid from one chamber and entrance of fluid to the other chamber necessitated in the movement of the pintle from one position to another, the said means for adjusting the position of said pintle being arranged to operate the valve means.

11. In a structure as set forth in claim 7 wherein the pump pintle in its different positions of adjustment on the squared portion of the tubular shaft provides chambers therein between the pintle and the shaft, at least one of said chambers being normally closed whereby to prevent the movement of the pintle, a valve for each of said chambers to control communication between the same and the inside of the casing, the said means for adjusting the position of the pintle being arranged to operate the valves in such a way that the valve for whichever chamber is decreased in volume in the movement of the pintle is opened and the valve for the other chamber is left closed, and means for admitting fluid under pressure from the pump to the other chamber.

12. In a structure as set forth in claim 7 wherein the pump pintle in its different positions of adjustment on the squared portion of the tubular shaft provides chambers therein between the pintle and the shaft, at least one of said chambers being normally closed whereby to prevent the movement of the pintle, a valve for each of said chambers to control communication between the same and the inside of the casing, the said means for adjusting the position of the pintle being arranged to operate the valve in such a way that the valve for whichever chamber is decreased in volume in the movement of the pintle is opened and the valve for the other chamber is left closed, means for admitting fluid under pressure from the pump to the other chamber, and a pair of plates on the squared portion of said tubular shaft closing the opposite ends of said chambers, at least one of said plates in the operation of the transmission being subjected to pressure whereby to bear against the pintle to hold the same frictionally in its adjusted position.

13. A structure as set forth in claim 7 including a pair of sealing rings substantially concentric with one another and disposed substantially concentrically within said casing between the pintle and vane elements of the pump and motor and detachably engaging a surface of one of said elements, the one ring establishing communication on the inside thereof between the inlet of the pump and the outlet of the motor, and the other ring establishing communication on the inside thereof between the outlet of the pump and the inlet of the motor, one or both of the rings being arranged to be unseated, the inner ring when unseated throwing the inlet and outlet of the pump as well as of the motor into open communication with one another and for the idling of the transmission, and the outer ring when unseated opening communication between the inside thereof and the inside of the fluid-tight casing, as desired, for the purposes of filling the transmission with the fluid medium.

14. A structure as set forth in claim 1 including a sealing ring normally preventing communication between the opposite sides of the vane of said motor, and manually operable means for unseating said ring whereby in effect to disconnect the vane from driving relation with the motor.

15. A structure as set forth in claim 7 including a pair of sealing rings, one normally preventing communication between the inlet and outlet sides of the pump and motor and the other normally preventing communication between the inside of the casing and one side of the pump and motor, and valve means associated with each of the aforesaid rings controlling communication between the inside of the rings and the inside of the casing, the said valve means being closed in the event of pressure existing inside the ring or rings but being arranged to open in the event of depression therein.

16. In a fluid transmission, the combination with a driving element such as a casing, and a driven element such as a shaft extending from the casing, of a fluid motor cylinder block mounted in the casing and arranged to turn therewith, a vane on said shaft providing an eccentric mounting for the block in the casing, the ends of the motor cylinder bores being open, pistons slidably received in the outer ends of the bores and directly engaging bearing surfaces on the inside of the casing for operation, so that fluid moved by the pistons transmits motion to the vane, a fluid pump cylinder block disposed in a plane parallel with the other block and also mounted in the casing and arranged to turn therewith, a stationary but adjustable pintle providing a mounting for said block in said casing arranged to be adjusted from a position concentric with the casing, the outer ends of the pump cylinder bores being open, pistons slidably received in the outer ends of the bores and directly engaging bearing surfaces on the inside of the casing for operation, and the inlet of the pump having communication with the outlet of the motor and there being communication between the outlet of the pump and the inlet of the motor.

17. A transmission as set forth in claim 16 wherein the pump inlet and outlet are on opposite sides of the pintle and the motor inlet and outlet are on opposite sides of the vane, and means directly between the pintle and vane and disposed concentric with the casing so that it always maintains the same relation to the pintle and vane in the turning of the casing, serving, whenever desired, to establish communication between the inlet of the pump and outlet of the motor and between the outlet of the pump and inlet of the motor.

18. In a fluid transmission, the combination of a supporting stationary tubular shaft, a casing rotatably supported thereon, a shaft bearing in the tubular shaft and extending therethrough into the casing, one of the two latter elements being the driving element and the other the driven element of the transmission, a vane within the casing fixed to the last mentioned shaft, a first fluid cylinder block turning on the vane within and eccentric to the casing, the outer ends of the bores of said first block being open, pistons received in the bores and normally extended therefrom for engagement with bearing surfaces provided therefor on the inside of the casing, means providing an off-center driving connection between the block and the casing, a second fluid cylinder block in said casing, said second block having the outer ends of the bores thereof open, pistons received in said bores and normally extended therefrom for engagement with bearing surfaces on the inside of said casing, means providing a universal driving connection between the casing and said second block to cause them to turn together whether concentric or eccentric with respect to one another, a pintle providing a mounting for said second block, said pintle being adjustable to different positions of eccentricity with respect to the casing, the vane of the first block serving to separate the outlet from the inlet side thereof, and the pintle of the second block serving to separate the inlet from the outlet side thereof, and means serving to establish communication between the inlet of the second block and the outlet of the first block and between the outlet of the second block and the inlet of the first block.

19. A structure as set forth in claim 18 wherein the last mentioned means comprises a sealing ring between the second block and first block bearing against a flat face on one side of the vane, the one side of the ring establishing communication between the inlet of the second block and outlet of the first block and the other side of the ring establishing communication between the outlet of the second block and inlet of the first block.

20. In a structure as set forth in claim 18, wherein the last mentioned means comprises a pair of concentric sealing rings between the second block and first block bearing against a flat face on one side of the vane, the one ring establishing communication between the inlet of the second block and outlet of the first block and the other between the outlet of the second block and inlet of the first block, the provision of manually operable means for unseating the inner ring whereby to place the inlets and outlets of the second block and first block, respectively, in open communication.

21. A structure as set forth in claim 18, wherein the means providing a universal driving connection between the casing and the second cylinder block comprises a generally rectangular slide, the same slidably engaging parallel bearing surfaces on the block at two opposed ends and slidably engaging parallel bearing surfaces on the casing at the other opposed ends substantially as and for the purposes described.

22. A structure as set forth in claim 18 wherein the heads of the pistons are grooved to facilitate the entry of fluid between the same and the bearing surfaces provided therefor on the inside of the casing.

23. A structure as set forth in claim 18 wherein the pistons have holes provided in the heads thereof establishing communication between the bores of the cylinders and the bearing surfaces for the pistons whereby to equalize the pressure within and without the pistons at each of the bearing surfaces and insure the entry of fluid between the heads of the pistons and the bearing surfaces substantially as described.

24. A fluid transmission comprising, in combination, a casing, a shaft extending therefrom substantially concentric therewith, one of the two elements referred to being the driving element and the other the driven element, a vane fixed on said shaft inside the casing, a first cylinder block turning on the vane and having an off-center driving connection with the casing, the bores of said first cylinder block being open at their outer ends, pistons operating in said bores and normally extended for engagement with bearing surfaces on the inside of said casing, the said vane serving to separate the inlet from the outlet of said first block, a fixed supporting element extending into the casing concentric with the shaft and casing, the same having a squared portion inside the casing, a pintle slidably engaging the squared portion and arranged to be adjusted to different positions of eccentricity with respect to the casing, a second cylinder block turning on said pintle, said second block having the outer ends of the bores thereof open, pistons operating in said latter bores and normally extended for engagement with bearing surfaces inside the casing, the said pintle serving to separate the inlet from the outlet of said second block, the front and rear faces of said pintle being flat, a pair of plates fitting on the squared portion of the fixed supporting element and snugly engaging the front and rear faces of said pintle so as to provide closed chambers within the pintle on opposite sides of the pintle supporting element, one of the two last mentioned plates having ports therein establishing communication between the inlet of the first block and the outlet of the second block and between the outlet of the first block and the inlet of the second block, a pair of valves in the other of said plates, one of which controls communication between the one pintle chamber and the inside of the casing and the other of which controls communication between the other pintle chamber and the inside of the casing, means whereby either of said chambers is arranged to be supplied with fluid under pressure from a source of pressure, and means for operating said valves arranged to open the valve for one chamber when the other is supplied with fluid.

25. In a structure as set forth in claim 24 wherein the plate having the ports therein has a bearing thereon concentric with the casing, a sealing ring mounted on said bearing and normally held in engagement with a flat face provided on one side of the vane, the one side of the ring completing communication through the one port of the plate between the inlet of the first block and outlet of the second block, and the other side of the ring completing communication through the other port of the plate between the outlet of the first block and the inlet of the second block, and means for unseating said ring for the purpose described.

26. In a structure as set forth in claim 24 wherein the plate having the ports therein has a pair of substantially concentric bearings thereon substantially concentric with the casing, a pair of concentric sealing rings mounted on said bearings and normally held in engagement with a flat face provided on one side of the vane, the one ring completing communication on the inside thereof through the one port of the plate between the inlet of the first block and outlet of the second block, and the other ring completing communication on the inside thereof through the other port of the plate between the outlet of the first block and the inlet of the second block, and manually operable means for unseating the one or both rings for the purposes stated.

27. In a structure as set forth in claim 24 wherein the plate having the ports therein has a pair of substantially concentric bearings thereon substantially concentric with the casing, a pair of concentric sealing rings mounted on said bearings and normally held in engagement with a flat face provided on one side of the vane, the one ring completing communication on the inside thereof through the one port of the plate between the inlet of the first block and outlet of the second block, and the other ring completing communication on the inside thereof through the other port of the plate between the outlet of the first block and inlet of the second block, manually operable means for unseating the inner ring for the purpose described, and means whereby the outer ring is also arranged to be unseated after the unseating of the inner ring for the purpose described.

28. A structure as set forth in claim 24, wherein the pintle has small holes provided therein leading to both pintle chambers from the outside of the pintle, said holes being arranged to communicate with the bores of the cylinders respectively on upper and lower dead centers substantially as and for the purposes described.

29. A structure as set forth in claim 24 wherein the plate provided with the ports has openings provided therein communicating with the inside of the casing, one of these openings being arranged to communicate with the inlet of the one block, there being a breather or check valve seating outwardly with reference to said inlet to close such communication, and the other of these openings being arranged to communicate with the inlet of the other block, and there being a breather or check valve seating outwardly with reference to said inlet arranged to control such communication substantially as and for the purposes described.

30. In a fluid transmission, the combination of a supporting stationary tubular shaft, a casing rotatably supported thereon, a shaft bearing in the tubular shaft and extending into the casing, one of the two last mentioned elements being the driver and the other the driven element of the transmission, two cylinder blocks in said casing disposed in planes parallel to one another, a vane fixed to the last mentioned shaft and holding one of said blocks eccentric with respect to the casing, means providing a crank connection between the block and the casing, pistons operated from the casing through the open outer ends of the bores of said block, a stationary pintle providing a support for the other block in said casing adjustable to different positions of eccentricity relative to the casing on the supporting stationary tubular shaft, means providing a universal sliding connection between the casing and the last mentioned block effective for all positions of eccentricity of said pintle, and pistons operated from the casing through the open outer ends of the bores in said last mentioned block, the inlet and outlet of the first block having communication respectively with the outlet and inlet of the second block.

31. In a fluid transmission, the combination of a fixed supporting element, a casing rotatable with respect thereto, a shaft supported by the first mentioned element and extending from the casing concentric therewith, the shaft and casing cooperating through the means hereinafter recited whereby the one constitutes the driver and the other the driven element of the transmission, a pair of cylinder blocks mounted in the casing in planes parallel to one another, a vane fixed on said shaft inside the casing and supporting one of said blocks in a predetermined eccentric relation to the casing, means providing a crank connection between the block and casing, pistons operated from the casing through the open outer ends of the bores in said block, said vane serving to separate the inlet from the outlet of the first block, a pintle for supporting the other block in said casing slidably engaging a squared portion on the fixed supporting element for adjustment to different positions of eccentricity relative to the casing, means providing a universal sliding connection between the second block and casing effective for all positions of eccentricity of said pintle, pistons operated from the casing through the open outer ends of the bores of said block, said pintle serving to separate the inlet from the outlet of the second block, and means for establishing communication between the inlet and outlet of the first block respectively with the outlet and inlet of the second block.

In witness whereof I have hereunto affixed my signature.

OSCAR E. ROSEN.